(12) United States Patent
Moore

(10) Patent No.: US 6,454,149 B1
(45) Date of Patent: Sep. 24, 2002

(54) DEVICE AND METHOD FOR TRANSPORTING ELONGATE OBJECTS USING A PICK-UP TRUCK

(76) Inventor: Kevin Moore, 3936 W. Evans Dr., Phoenix, AZ (US) 85053

( * ) Notice: Subject to any disclaimer, the term of this patent is extended or adjusted under 35 U.S.C. 154(b) by 0 days.

(21) Appl. No.: 09/562,172

(22) Filed: May 2, 2000

(51) Int. Cl.[7] .................................................. B60R 7/00
(52) U.S. Cl. ...................... 224/405; 224/403; 224/309; 224/327; 410/110; 296/39.1
(58) Field of Search ................................ 224/402, 403, 224/405, 309, 324, 327; 410/110; 296/39.1

(56) References Cited

U.S. PATENT DOCUMENTS

| | | | |
|---|---|---|---|
| 3,047,161 A | 7/1962 | Thacker | |
| 3,884,404 A | 5/1975 | Frost | |
| 4,389,067 A | 6/1983 | Rubio | |
| 4,630,990 A | 12/1986 | Whiting | |
| 4,957,400 A | * 9/1990 | Karp | 410/110 |
| 4,984,837 A | 1/1991 | Dise | |
| 5,067,644 A | 11/1991 | Coleman | |
| 5,257,728 A | * 11/1993 | Gibson | 224/110 X |
| 5,553,760 A | 9/1996 | Wright et al. | |
| D387,722 S | 12/1997 | Fujinaka | |

* cited by examiner

Primary Examiner—Stephen K. Cronin

(57) ABSTRACT

The device and method according to the present invention are useful for limiting unwanted movement of lengthy objects being transported by a pick-up truck. The device is comprised of two separate units that are used with each other. There is a first unit that is a cab protection unit. The cab protection unit is removably mountable on a top surface of the cab of the pick-up. The cab protection unit has a top surface, a bottom surface, a front surface, a rear surface, and angled load bearing surface that extends between the top surface and the rear surface, and two side surfaces. The bottom surface has a flat portion that rests upon the top of the truck cab. The bottom surface may also include a curved portion that fits snuggly around the rear edge of the cab and against a portion of the rear of the cab. The angled load bearing surface preferably is an angled flat portion with a most preferred angle of 45°. The front, rear, and two side surfaces are generally flat, but may have texture or printed materials placed upon them (the printed materials may be advertisements selected by either the manufacturer or by the user).

11 Claims, 3 Drawing Sheets

DEVICE AND METHOD FOR TRANSPORTING ELONGATE OBJECTS USING A PICK-UP TRUCK

FIELD OF THE INVENTION

The present invention relates generally to a device and method used in loading and transporting lengthy objects on a pick-up truck. More specifically, the present invention is a device and method for securing the lengthy objects to the pick-up truck such that they do not easily shift during transportation.

BACKGROUND

Pick-up trucks are designed to safely transport objects of certain dimensions. However, when objects exceed these certain dimensions, they are more likely to shift in transport and even leave the vehicle. This usually occurs when the object is lengthy and has been propped against either the cab or the tailgate of the pickup truck. Examples are found in the transport of ladders, long boards, poles, and other lengthy objects.

Indeed, anyone who has traveled on the highways of an urban area has seen where improperly secured objects, such as ladders, boards and the like, have fallen out of a transporting vehicle and partially, or completely, obstruct the roadway. These are very dangerous situations.

The prior art shows numerous different attempts to address this and other needs. One commonly found solution is a rack that is mounted to the pick-up bed. The rack may or may not include a portion that overhangs the cab of the truck. While this aids in the transport of lengthy objects, it still relies upon the user to properly secure the objects to the rack. Also, for aesthetic and other reasons many vehicle owners will not mount a rack onto the bed of their truck. An example of this type of prior art device is fund in U.S. Pat. No. 5,067,644, issued to Coleman. This patent discloses a load carrying rack that is mounted onto a vehicle roof. The rack includes straps for securing the load to the rack device. Another example of this type of prior art device is illustrated in the drawings contained in U.S. Pat. No. 5,553,760 issued to Wright, et al. Yet another example is found in U.S. Pat. No. 3,884,404, issued to Frost.

Another prior art device is a multi-piece racking systems. An example of a multi-piece rack is found in U.S. Pat. No. 4,630,990, issued to Whiting. In this patent, there are two pieces to the racking system. A front piece that is mounted onto the cab of the truck, and a rear piece that is mounted onto the rear bumper of the truck. The large or long object to be transported is then placed upon the front and rear pieces. Straps are provided on each separate piece to secure the object being transported to the racking system. However, this entails the lengthy process of mounting and dismounting the separate pieces onto the truck. Further, it is a large bulky unit that is undoubtedly expensive and difficult to store. Yet another example is found in U.S. Pat. No. 3,884,404, issued to Frost.

Another type of solution has been to provide devices that are designed to protect specific portions of the truck exterior, such as the cab or the tailgate. An example of a cab protective device is found in U.S. Pat. No. 4,984,837, issued to Dise. This patent discloses a device that is mounted to a side portion of the cab, and extends over the top portion of the cab. Long objects are placed in the bed of the truck such that they extend over the cab and rest upon the device of the Dise patent. There are side arms that project upward to prevent the objects from sliding laterally off of the cab of the truck. Another example is found in U.S. Pat. No. 3,047,161, issued to Thacker. This device is a rack that mounts immediately behind the cab and projects up past the top of the cab. Long objects that extend past the cab are supported over the cab, thereby protecting the surface of the cab. Additionally, as in the Dise patent discussed above, there are portions of the rack that project up past the central portion to prevent unwanted lateral movement of the supported objects.

An example of a tailgate protecting device may be found in U.S. Pat. No. 4,389,067, issued to Rubio. This patent discloses a small rack that is mounted onto a top portion of the tailgate and that projects upward above the tailgate. Thus, objects that are placed in the bed of the truck and that extend past the tailgate rest upon the mounted rack and do not mar the surface of the tailgate. This device does not, however, address the problem of lateral movement of the supported object. Another example of a tailgate protection device may be found in U.S. Pat. No. DES. 387,722, issued to Fujinaka. This patent illustrates a device that appears to be mountable onto a top portion of the truck tailgate and that supports transported objects. As with the Fujinaka patent above, this device does not address the problem of lateral movement of the transported object.

Finally, U.S. Pat. No. 4,957,400, issued to Karp discloses a complex system of cab and tailgate protectors used in combination with a series of straps. A cab protector is mounted onto the cab, a tailgate protector is mounted onto the tailgate and the object is supported on the two protectors. Then a series of straps are attached to the truck at a variety of points, such as strap hooks and gutters commonly found on pick-up trucks. These straps securely hold the supported object to the protective devices.

However, there is still a clear and continuing need for devices and methods that are portable and easy to store and that aid in the transport of lengthy objects on a pick-up truck while protecting the cab of the pick-up truck.

SUMMARY OF THE INVENTION

It is an object of the present invention to provide a device and method for the transport of lengthy objects on a pick-up truck.

It is another object of the present invention to provide a device and method for the transport of lengthy objects on a pick-up truck that securely holds the transported object and limits unwanted lateral movement of the transported object.

It is a further object of the present invention to provide a device and method for the transport of lengthy objects on a pick-up truck that is small, removable, and portable.

It is yet another object of the present invention to provide a device and method for the transport of lengthy objects on a pick-up truck that is less costly to the consumer, thereby encouraging them to buy and use the device.

It is yet a further object of the present invention to provide a device and method for the transport of lengthy objects on a pick-up truck, where the device is comprised of a support unit and a strap unit that is mounted at one end to the bed of the pick-up truck.

It is still yet another object of the present invention to provide a device and method for the transport of lengthy objects on a pick-up truck, where the device is comprised of a support unit and a strap unit that is mounted at one end to the bed of the pick-up truck, said strap unit being manually tensionable by the user of the device.

It is still yet a further object of the present invention to provide a device and method for the transport of lengthy objects on a pick-up truck, where the device is comprised of a support unit and a strap unit that is mounted at one end to the bed of the pick-up truck, said support unit being removable attached to the cab of the pick-up truck and said strap unit including a securing portion bolted to the bed of the pick-up truck and having a manually tensionable strap that extends between the securing portion of the strap unit and the object being transported, where the downward force provided by the tension in the strap keeps the transported object secured held against the support unit and prevents unwanted lateral (or forward) movement of the transported object.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF PREFERRED EMBODIMENTS

Figure 1:
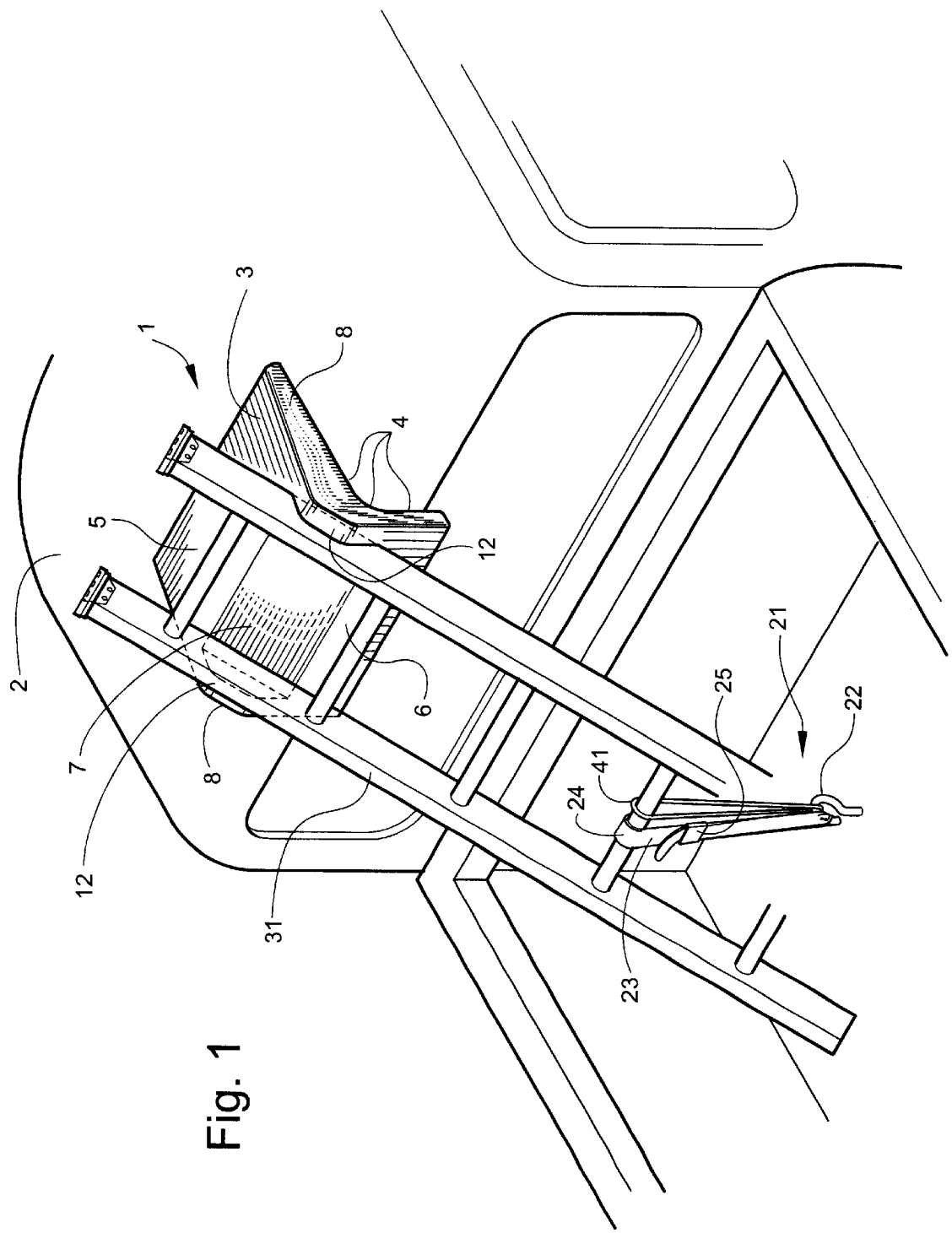
FIG. 1 is a perspective view illustrating the use of the present invention.
Figure 2:
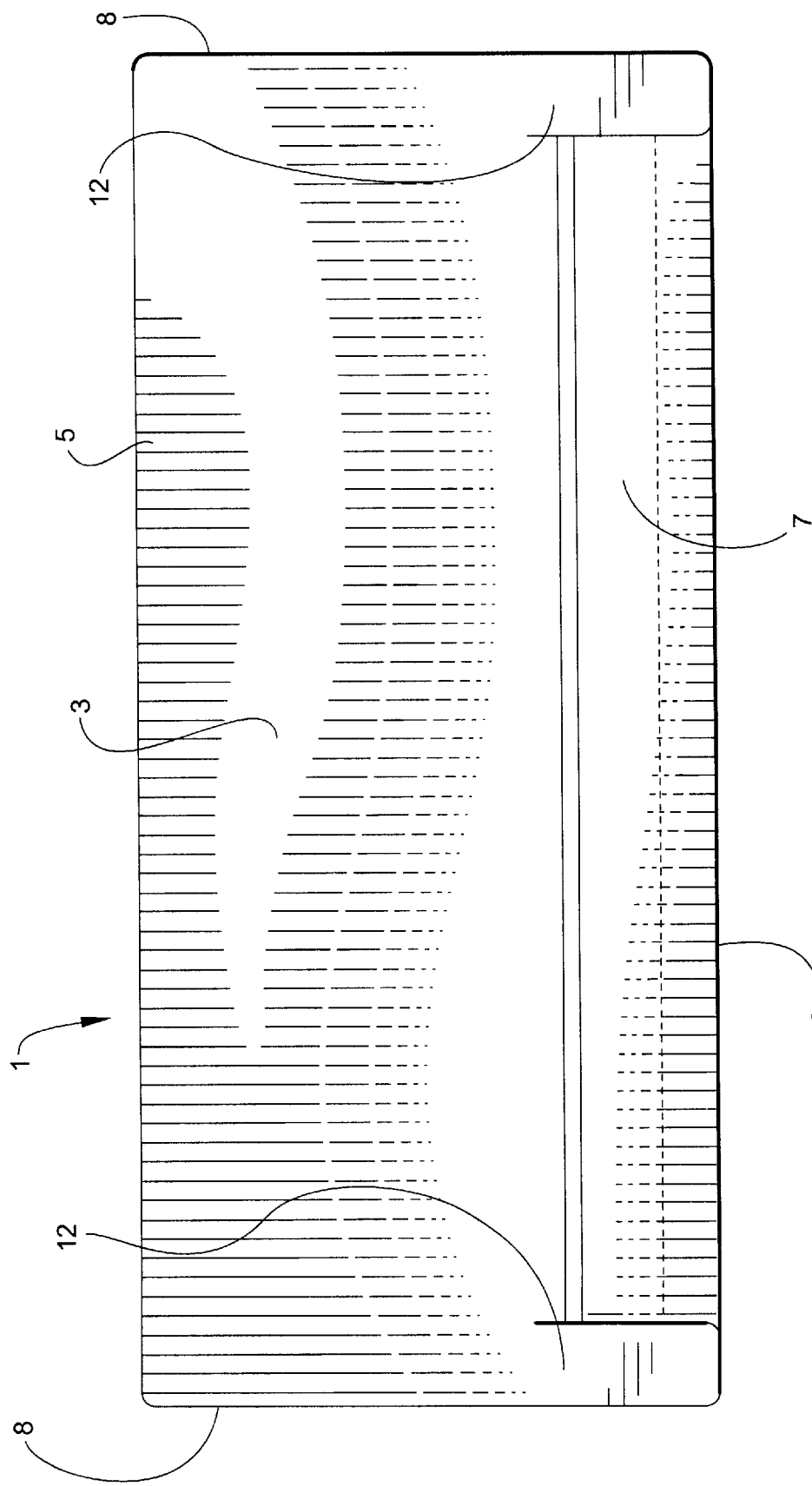
FIG. 2 shows a top view of the cab protection unit of the present invention.
Figure 3:
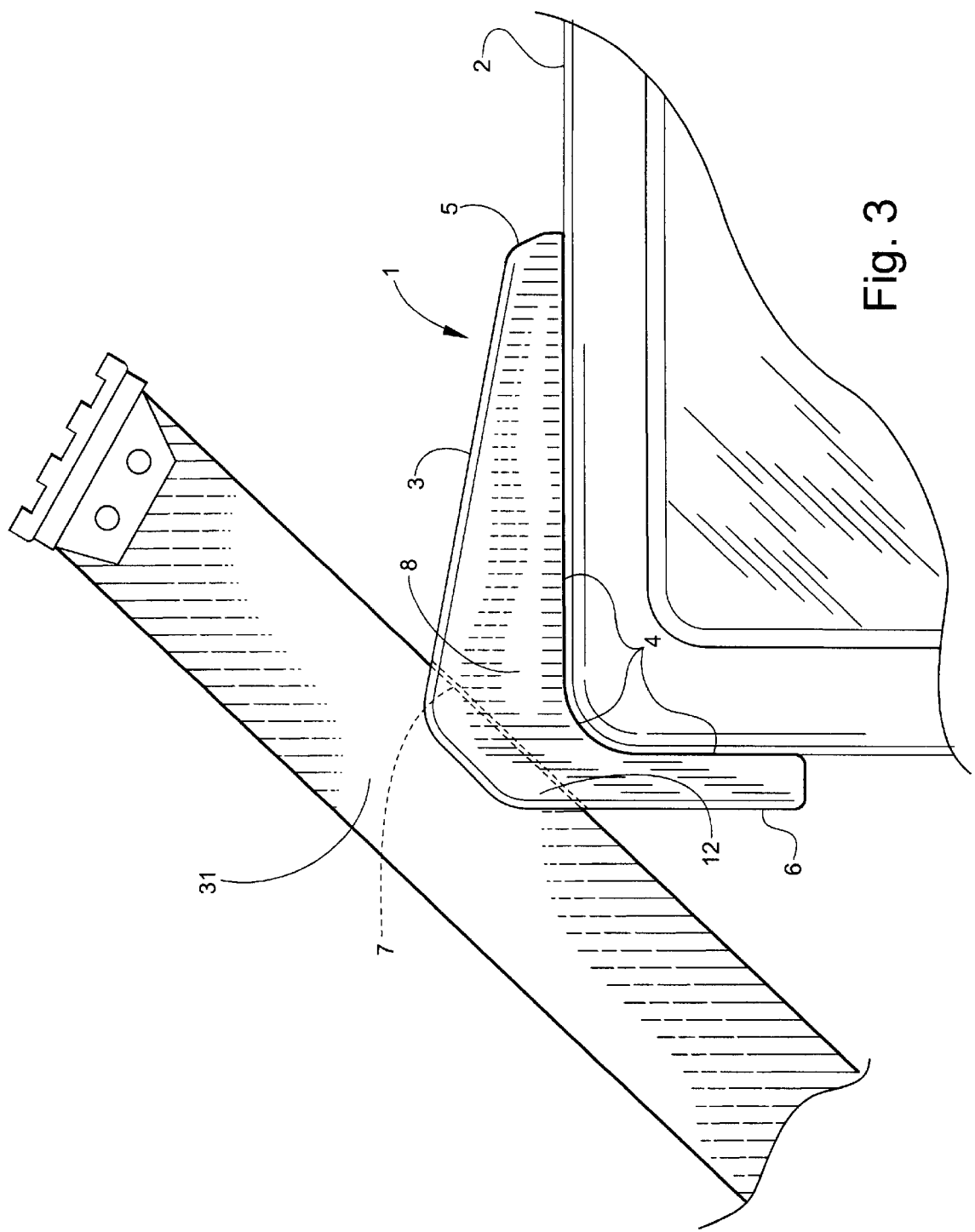
FIG. 3 shows side view of the cab protection unit of the present invention.

The kit and method according to the present invention are useful for limiting unwanted movement of lengthy objects being transported by a pick-up truck. More specifically, helps prevent the loss of these lengthy objects 31 during transport.

Generally, the kit according to the present invention is comprised of two separate units that are used with each other. There is a first unit that is a cab protection unit 1. The cab protection unit 1 is removably mountable on a top surface of the cab of the pick-up 2. The cab protection unit 1 has a top surface 3, a bottom surface 4, a front surface 5, a rear surface 6, and angled load bearing surface 7 that extends between the top surface 3 and the rear surface 6, and two side surfaces 8. The bottom surface 4 has a flat portion that rests upon the top of the track cab. The bottom surface 4 may also have a curved portion that fits snuggly around the rear edge of the cab and against a portion of the rear of the cab. The angled load bearing surface 7 preferably is an angled flat portion with a most preferred angle of 45°. More specifically, in the cab protection unit 1, the a rear surface 6 is joined at a first edge to a first edge of the bottom surface 4, the angled load bearing surface 7 is joined at first edge to a second edge of the rear surface 6, the top surface 3 is joined at a first edge to a second edge of the angled load bearing surface 7, the front surface 5 that is joined at a first edge to a second edge of the top surface 3, said front surface 5 is also joined at a second edge to a second edge of the bottom surface 4. The two side surfaces 8, of course, join at all side edges of the top, front, bottom, rear, and angled load bearing surfaces, 3, 5, 4, 6, and 7, respectively.

In one embodiment, the top surface 3 is a smooth surface, while in another embodiment, the top surface 3 has a textured surface to provide increased fiction that helps hold the supported lengthy objects 31 in place, thereby also reducing unwanted lateral movement of the lengthy objects 31. The front 5, rear 6, and two side surfaces 8 are generally flat, but may have texture or printed materials placed upon them (the printed materials may be advertisements selected by either the manufacturer or by the user).

The cab protection unit 1 is preferably a polymer or elastomer molded unitary piece. The use of a polymer or elastomer allows the cab protection unit 1 to be placed on the cab and generally held in place by the friction between the cab protection unit 1 and the cab. However, an adhesive layer, magnetic materials, or physical securing means, such as bolts or screws and the like, may be used to further secure the cab, protection unit 1 in place. The preferred embodiment of the cab protection unit 1 is easily removable to allow for quick mounting and dismounting. The small size of the cab protection unit 1 allows for portability and convenient storage.

In a preferred embodiment, the cab protection unit 1 has two upwardly projecting portions 12, one located at each side of the top surface 3. These upwardly projecting portions 12, which are preferably formed during the molding process, serve to further limit unwanted lateral movement of the supported lengthy object 31.

There is a second unit, a strap unit 21. The strap unit 21 is secured at one end to the bed of the truck. In one embodiment, there is a securing portion 22 that is secured to the bed of the pick-up truck. While the securing portion 22 may be permanently secured to the bed, it also may be quasi-permanently secured such that it may be removed with some effort. The strap unit 21 further includes a tensioner or a tensioning unit 23 that is attached at one end to the securing portion 22 and is generally attached at the remaining end to the lengthy object 31 being transported. The tensioning unit 23 may be permanently attached to the securing portion 22, such as by and I-bolt or other like means, or it may be removably attached such as by a clip or the like. Alternately the tensioning unit 23 may extend between the lengthy object 31 and a portion of the bed, such as an included bed lip. However, the tensioning unit 23 necessarily needs to be removably attachable to the lengthy object 31, whether directly or indirectly, such as by wrapping a portion of the tensioning unit 23 around the lengthy object 31 and attaching it back upon itself.

Preferably, the tensioning unit 23 is at least one length of a flexible material 24, such as a fabric material. Further, the tensioning unit 23 may include a variable length adjuster 25 that, by adjustment, allows variable tension to be placed on the tensioning unit 23. Herein, the term tension means the stress resulting from the elongation of a body.

Once attached to the lengthy object 31, the tensioning unit 23 is adjusted such that there is tension between the lengthy object 31 and the securing portion 22. The tension in the tensioning unit 23 is used to securely hold the lengthy object 31 to the truck using the downward force caused by tension in the tensioning unit 23. In the preferred embodiment, the cab protection 1 and tensioning unit 23 are stored behind seats located in the cab of the vehicle.

For security, there is a security device 41, such as a locking security cable, that extends between the lengthy object 31 and either the securing portion 22 or an other portion of the truck bed that prevents theft of the lengthy object 31 when the vehicle is unoccupied.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A kit for securing a lengthy object to a vehicle comprising:
   a. a cab protection unit that is able to attach to a top surface of a cab of a vehicle and underneath a lengthy object to be secured to the vehicle wherein the cab protection unit comprises a bottom surface, a rear surface that is joined at a first edge to a first edge of the bottom surface, an angled load bearing surface that is joined at first edge to a second edge of the rear surface, a top surface that is joined at a first edge to a second edge of the angled load bearing surface, a front surface that is joined at a first edge to a second edge of the top surface, said front surface also joined at a second edge to a second edge of the bottom surface, the cab protection unit further comprising two upwardly projecting portions, one located at each side of the top surface, used in combination with
   b. a strap unit that includes a tensioning unit and a securing portion, the securing portion able be secured to a bed of the vehicle and the tensioning unit able to attach between the securing portion and the lengthy object to be secured and further able, by providing tension between the lengthy object and the vehicle, to securely hold the lengthy object to the vehicle.

2. The kit of claim 1 wherein the tensioning unit is removable attachable to the securing portion.

3. The kit of claim 2 wherein the tensioning piece further includes a variable length adjuster that allows variable tension to be applied to the tensioning piece.

4. The kit according to claim 2 further comprising a securing device that is able to lock the lengthy object to the vehicle, said securing device able to preventing unwanted removal of the, lengthy object.

5. The kit of claim 1 wherein the tensioning unit is quasi-permanently attached to the securing portion.

6. The kit of claim 5 wherein the tensioning piece further includes a variable length adjuster that allows variable tension to be applied to the tensioning piece.

7. The kit according to claim 5 further comprising a securing device that is able to lock the lengthy object to the vehicle, said securing device able to preventing unwanted removal of the lengthy object.

8. A method for securing a lengthy object to a vehicle comprising the steps of:
   a. providing a cab protection unit that fits between the lengthy object and a cab of the vehicle wherein the cab protection unit comprises a bottom surface, a rear surface that is joined at a first edge to a first edge of the bottom surface, an angled load bearing surface that is joined at first edge to a second edge of the rear surface, a top surface that is joined at a first edge to a second edge of the angled load bearing surface, a front surface that is joined at a first edge to a second edge of the top surface, said front surface also joined at a second edge to a second edge of the bottom surface, the cab protection unit further comprising two upwardly projecting portions, one located at each side of the top surface;
   b. providing a strap unit that secures to a bed of the vehicle, said strap unit comprising a securing portion and a tensioning unit;
   c. providing tension between the lengthy object and the vehicle by attaching the tensioning unit between the securing portion and the lengthy object.

9. The method according to claim 8 a firther including the step of attaching a securing device between the vehicle and the lengthy object to prevent unwanted removal of the lengthy object.

10. The method according to claim 8 wherein the step of providing tension between the lengthy object and the vehicle is accomplished by adjusting a variable length adjuster that is included in the tensioning unit.

11. The method according to claim 10 further including the step of attaching a securing device between the vehicle and the lengthy object to prevent unwanted removal of the lengthy object.

\* \* \* \* \*